US012634368B1

(12) United States Patent
Chhajer

(10) Patent No.: US 12,634,368 B1
(45) Date of Patent: May 19, 2026

(54) DATA TRANSFER AS TEXT USING MULTIMODAL LANGUAGE MODELS

(71) Applicant: Honda Motor Co., Ltd., Tokyo (JP)

(72) Inventor: Rajeev Chhajer, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 18/953,596

(22) Filed: Nov. 20, 2024

(51) Int. Cl.
H04L 67/60 (2022.01)
H04L 67/12 (2022.01)

(52) U.S. Cl.
CPC .............. H04L 67/12 (2013.01); H04L 67/60 (2022.05)

(58) Field of Classification Search
None
See application file for complete search history.

(56) References Cited

U.S. PATENT DOCUMENTS

2021/0063198 A1    3/2021  Nister et al.
2021/0197665 A1    7/2021  Won

2022/0058579 A1    2/2022  Chong et al.
2022/0134880 A1    5/2022  Lee et al.
2025/0258851 A1*   8/2025  Lewis ..................... G06N 20/00

FOREIGN PATENT DOCUMENTS

CN       116644107 A    8/2023
CN       117763194 A    3/2024
CN       117151338 B    5/2024
DE       102019127565 A1    4/2021
DE       102022106291 A1    9/2023
IN       202241077305 A    1/2023

* cited by examiner

*Primary Examiner* — Cai Y Chen
(74) *Attorney, Agent, or Firm* — Morgan Lincoln; American Honda Motor Co., Inc.

(57) ABSTRACT

A vehicle and method for data transfer as text using multimodal language models (MLMs) is provided. The vehicle comprises circuitry that receives vehicle data from a sensor system of the vehicle. The vehicle data comprises visual information associated with a surrounding environment of the vehicle. The circuitry prepares a prompt for a multimodal language model (MLM) based on the visual information and generates a textual description associated with the visual information, based on application of the MLM on the prompt. The circuitry transmits the textual description to a network infrastructure device, via a communication network.

20 Claims, 11 Drawing Sheets

300

Prompt 320

Base Instruction: Identify all of the objects in the plurality of images and their relative positions in the surrounding environment Contextual Information: Plurality of Images 312

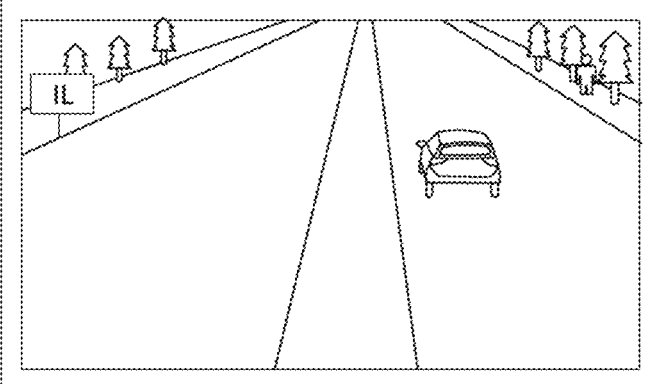

Multimodal Language Model 116

322

Textual Description: The vehicle is on a section of Route 66 in Illinois, with another four-wheeled vehicle in front, a pedestrian on a pavement on the right sie of the road, and oak trees on both sides of the road

Prompt 410

Base Instruction: Identify moving and non-moving objects in the scene and record any unsafe behavior of the objects at the given speed of the vehicle.

Contextual Information: Plurality of Images 406

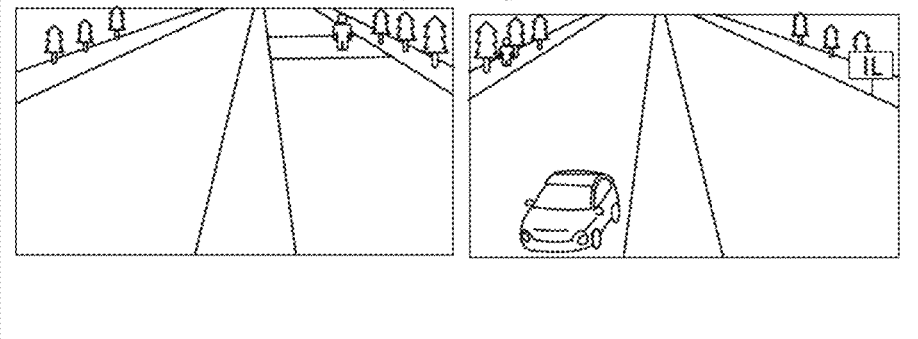

Multimodal Language Model 116

412

Textual Description: The vehicle is on a road section with a vehicle tailgating the vehicle and a person is crossing the road in an unsafe manner. The road has oak trees on both sides of the road. The road condition is poor with potholes, and it is advised to drive car up to a speed of 30-40 mph.

FIG. 4B

Textual Description 606
The vehicle is on a section of Route 66 in Illinois, with another four-wheeled vehicle in front, a pedestrian on a pavement on the right sie of the road, and oak trees on both sides of the road Communication Network 122

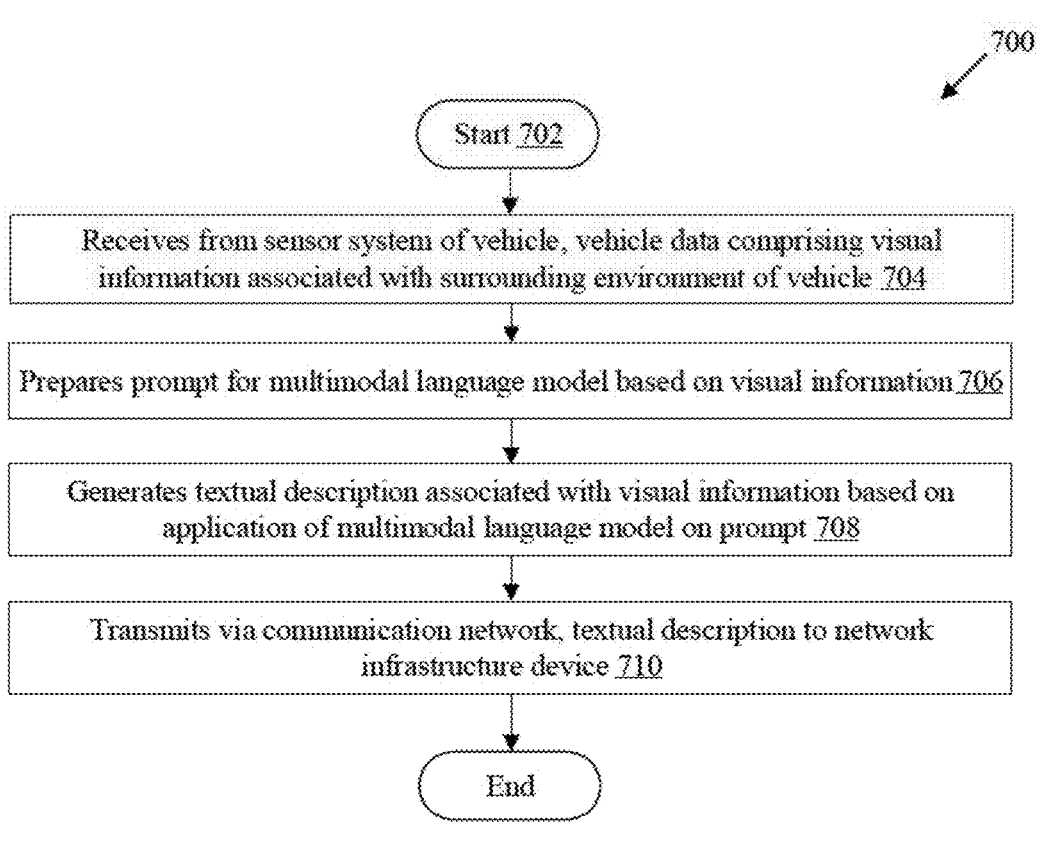

700

Start 702

Receives from sensor system of vehicle, vehicle data comprising visual information associated with surrounding environment of vehicle 704

Prepares prompt for multimodal language model based on visual information 706

Generates textual description associated with visual information based on application of multimodal language model on prompt 708

Transmits via communication network, textual description to network infrastructure device 710

End

FIG. 7

DATA TRANSFER AS TEXT USING MULTIMODAL LANGUAGE MODELS

BACKGROUND

Advancement and rise of autonomous vehicles are due to significant research results obtained in the fields of wireless and embedded systems, sensors, communication technologies, navigation, data acquisition, and analysis. With the emerging advancements in automated vehicles, there may be scenarios involving the generation of telematics data within these vehicles, which may be valuable and informative for data analysis and new data value opportunities. Existing vehicular systems employ a cloud infrastructure connected to an automated vehicle to provide more computational resources for executing telematics data processing functions and facilitating detailed analysis of the telematics data. However, these systems may face challenges related to the transfer of high-resolution telematics data (e.g., images or 3D data) to the cloud infrastructure due to constraints associated with size and transfer efficiency. Additionally, issues such as communication delays between the cloud infrastructure and the automated vehicle may arise when using cloud services, potentially limiting the analysis of telematics data, and thereby restricting the discovery of new data value opportunities from the telematics data.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a vehicle is provided. The vehicle may include a memory and circuitry. The memory may be configured to store a multimodal language model. The circuitry may receive vehicle data from a sensor system of the vehicle. The vehicle data may include visual information associated with a surrounding environment of the vehicle. The circuitry may further prepare a prompt for the multimodal language model based on the visual information and may generate a textual description associated with the visual information based on application of the multimodal language model on the prompt. The circuitry may transmit the textual description to a network infrastructure device, via a communication network.

According to another embodiment of the disclosure, a method in the vehicle is provided. The vehicle may include a memory configured to store the multimodal language model. The method may include reception of the vehicle data from the sensor system of the vehicle and preparation of the prompt for the multimodal language model based on the visual information. The method may further include generation of the textual description associated with the visual information based on the application of the multimodal language model on the prompt. The method may further include transmission of the textual description to the network infrastructure device, via the communication network.

According to another embodiment of the disclosure, a non-transitory computer-readable medium is provided. The non-transitory computer-readable medium has stored thereon, computer-executable instructions that when executed by a vehicle, causes the vehicle to execute operations. The operations include receiving, from a sensor system of the vehicle, vehicle data comprising visual information associated with a surrounding environment of the vehicle. The operations further include preparing a prompt for a multimodal language model based on the visual information and generating a textual description associated with the visual information based on application of the multimodal language model on the prompt. The operations further include transmitting, via a communication network, the textual description to a network infrastructure device.

BRIEF DESCRIPTION OF THE DRAWINGS

FIGS. 3A and 3B are block diagrams that collectively illustrate an exemplary scenario for data transfer as text using multimodal language models, in accordance with an embodiment of the disclosure.

FIGS. 4A and 4B are block diagrams that collectively illustrate an exemplary scenario for data transfer as text using multimodal language models, in accordance with an embodiment of the disclosure.

FIG. 7 is a flowchart that illustrates exemplary method of data transfer as text using multimodal language models, in accordance with an embodiment of the disclosure.

Figure 1:
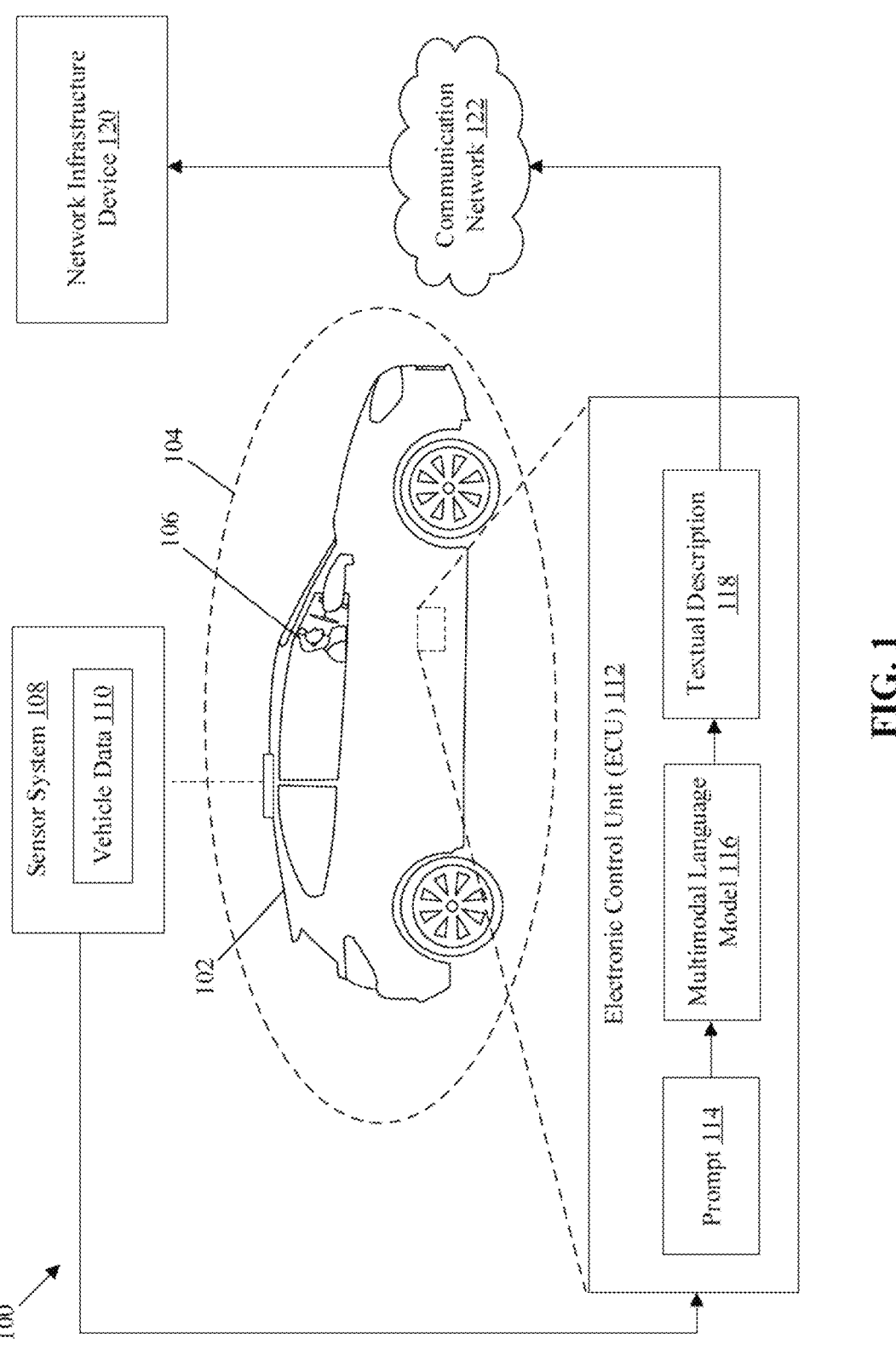
FIG. 1 is a block diagram that illustrates an exemplary environment for facilitating data transfer as text using multimodal language models, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed vehicle and a method for data transfer as text using multimodal language models (MLMs). Exemplary aspects of the disclosure provide a vehicle that may comprise memory and circuitry. The memory may be configured to store a multimodal language model (MLM). The circuitry may be configured to receive vehicle data from a sensor system of the vehicle. The vehicle data may include visual information associated with the surrounding environment of the vehicle. The visual information may include, for example, an image associated with the surrounding environment, a two-dimensional (2D) image sequence associated with the surrounding environment, or a three-dimensional (3D) scan associated with the surrounding environment. The circuitry may be further configured to prepare a prompt for the MLM based on the visual information and generate a textual description associated with the visual information based on the application of the MLM on the prompt. The circuitry may be further configured to transmit the textual description to a network infrastructure device via a communication network.

Traditional vehicle data transfer models often depend on a cloud infrastructure connected to a vehicle to provide more computational resources for the automated, to execute telematics data processing functions, and to facilitate detailed analysis of the telematics data. This dependency leads to challenges with respect to the transfer of the telematics data (e.g., high-resolution images or 3D scans) due to constraints related to size and transfer efficiency, communication delays between the cloud infrastructure and the vehicle, limitations in the analysis of the telematics data, and limited learning of new data value opportunities from the telematics data.

The present disclosure provides a vehicle and a large language model (LLM)-based system designed to facilitate the easy transfer of telematics data irrespective of constraints related to size and transfer efficiency, prevent communication delays between the cloud infrastructure and the automated vehicle, facilitate effective and comprehensive analysis of the telematics data, and expand learning of new data value opportunities from the 3D telematics data. The vehicle of the present disclosure may be equipped with an Electronic Control Unit (ECU) or a compatible application to facilitate communication with a centralized cloud platform. The vehicle leverages the LLM, which plays a central role in receiving the telematics data (e.g., images) for analysis, dynamically learning from the received telematics data, and converting the telematics data into a text format, considering the visual information associated with the surrounding environment of the vehicle and a prepared prompt for the LLM. Unlike traditional vehicle data transfer models, the disclosed system may leverage dynamic learning based on visual information from the vehicle's surrounding environment and the prepared prompt for the LLM. This approach may enable comprehensive analysis of 3D telematics data, enhances data transfer efficiency, and optimizes the utilization of 3D telematics data to uncover new data opportunities. The disclosed vehicle may allow for real-time monitoring and analysis of the received telematics data, ensuring that the telematics data is used in the most efficient manner possible for the exploration of new data value opportunities in the form of text.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary environment for facilitating data transfer as text using multimodal language models, in accordance with an embodiment of the disclosure. With reference to FIG. 1, there is shown an environment diagram 100. The environment diagram 100 may include a vehicle 102, a surrounding environment 104 of the vehicle 102, a driver 106 of the vehicle 102, a sensor system 108 of the vehicle 102, an Electronic Control Unit (ECU) 112 of the vehicle 102, and a network infrastructure device 120. The vehicle 102, the sensor system 108, the ECU 112, and the network infrastructure device 120 may communicate with each other via one or more networks (such as a communication network 122). A database (not shown) may be provided to store information such as vehicle data 110 (such as driver data and visual information associated with the vehicle 102), and a textual description 118 associated with the visual information.

The vehicle 102 may include suitable logic, control circuitry, interfaces, and/or code that may be configured to receive the vehicle data 110 from the sensor system 108 of the vehicle 102. The vehicle data 110 may include the visual information associated with the surrounding environment 104 of the vehicle 102. Further, the vehicle 102 may prepare a prompt 114 for a multimodal language model 116 based on the visual information. Further, the vehicle 102 may generate the textual description 118 associated with the visual information, based on application of the multimodal language model 116 on the prompt 114. The textual description 118 may include at least one of a natural language description of a scene depicted via the visual information, a natural language description of real-world objects in the scene, a natural language description of one or more activities depicted via the visual information, or a description of an unsafe driving behavior of the driver 106. The vehicle 102 may transmit the textual description 118 to the network infrastructure device 120 via the communication network 122.

The vehicle 102 may be a non-autonomous vehicle, a semi-autonomous vehicle, or a fully autonomous vehicle. Examples of the vehicle 102 may include, but are not limited to, a two-wheeled vehicle, a three-wheeled vehicle, a four-wheeled vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the two-wheeled vehicle may include, but are not limited to, an electric two-wheeled bike, an internal combustion engine (ICE)-based two-wheeled bike, or a hybrid two-wheeled bike. Similarly, examples of the four-wheeled vehicle may include, but are not limited to, an electric car, an internal combustion engine (ICE)-based car, a fuel-cell based car, a solar powered-car, or a hybrid car. The present disclosure may be also applicable to other types of vehicles. The description of other types of has been omitted from the disclosure for the sake of brevity.

As used herein, the term "surrounding environment 104" may refer to the immediate external area around a vehicle (such as the vehicle 102), encompassing all physical objects, conditions, and elements that are in proximity to the vehicle. This may include, but is not limited to, other vehicles, pedestrians, road infrastructure, traffic signals, weather conditions, and any other factors that may influence or interact with the vehicle's operation and safety.

As used herein, the term "driver 106" may refer to the individual who is operating and controlling a vehicle. This includes the person responsible for steering, accelerating, braking, and making decisions to navigate the vehicle safely and efficiently.

The sensor system 108 may include a set of vehicular sensors, such as but not limited to, 2D imaging sensors (such as cameras), 3D imaging sensors (such as a LIDAR), a Radar sensor, a proximity sensor, a speedometer, an accelerometer, a location sensor, a tachometer, a weather sensor, an imaging sensor, a pressure sensor, a temperature sensor, a level sensor, and the like. The speedometer may measure an instantaneous or an average speed of the vehicle 102. The accelerometer may measure an instantaneous or average acceleration of the vehicle 102. The location sensor may determine a location of the vehicle 102. The tachometer may determine a speed in rotations per minute of the engine of the vehicle 102. The weather sensor may determine a weather of the location of the vehicle 102. The imaging sensor may capture images of a region around the vehicle 102. The pressure sensor may determine a pressure of fluids (for example, engine oil, transmission oil, and brake oil) of the vehicle 102. The level sensor may determine a level of fluids of the vehicle 102. The temperature sensor may determine a temperature of a region around the vehicle 102.

As used herein, the term "vehicle data 110" may refer to the collection of both visual and non-visual information generated, captured, or processed by a vehicle's systems. This includes, but is not limited to, data from sensors, cameras, radar, lidar, GPS, and other onboard diagnostic systems. Visual information may encompass images, video feeds, and other graphical representations of the vehicle's surroundings. Non-visual information may include speed, acceleration, engine performance, fuel levels, tire pressure, and other telemetry data that provide insights into the vehicle's operational status and environmental interactions.

The ECU 112 may be a specialized electronic control circuitry that may include an ECU processor to control different functions, such as, but not limited to, engine operations, communication operations, data acquisition, and machine learning operations. In an embodiment, the ECU 112 may be a microprocessor. Other examples of the ECU 112 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. The ECU 112 may be included or integrated in the vehicle 102.

In an embodiment, the ECU 112 may receive the vehicle data 110 from the sensor system 108 of the vehicle 102 and may prepare the prompt 114 for the multimodal language model 116 based on visual information in the vehicle data 110. The ECU 112 may generate the textual description 118 associated with the visual information, based on the application of the multimodal language model 116 on the prompt 114. Further, the ECU 112 may transmit via the communication network 122, the textual description 118 to the network infrastructure device 120.

As used herein, the term "prompt 114" may be a natural language text describing a task to be performed by the multimodal language model 116. The natural language text may be in form of a structured instruction that may be interpreted and understood by the multimodal language model 116. For example, a typical prompt may be a description of a desired output.

The multimodal language model 116 may be a machine learning model to analyze the prompt 114 and generate the textual description 118 based on the analyzed prompt 114. The multimodal language model 116 may be trained on a large dataset of question-answer pairs to interpret human language or other types of complex data. In certain instances, the dataset may be particular to vehicles and environment conditions in which the vehicles typically operate.

In an embodiment, the multimodal language model 116 may be a type of an artificial intelligence system (also referred to as an artificial deep neural network) configured to process and understand multiple types of data modalities, such as text, images, audio, 3D data, and video, simultaneously. The multimodal language model 116 may extend the capabilities of traditional large language models (LLMs) by integrating various forms of data, enabling a more comprehensive understanding and generation of information across different media types. In some embodiments, the multimodal language model 116 may be a large language model, such as a transformer-based decoder-only model, an encoder-decoder model (that uses transformers), or a model that uses neural networks other than transformers. In these or other embodiments, the multimodal language model 116 may include multiple encoders specialized for processing different modalities of data (such as image and text). The multimodal language model 116 may include a Fusion mechanism to integrate the outputs from various encoders.

Techniques like cross-attention mechanism or multimodal transformers may be used to combine the different data types (such as text and image of a prompt) into a unified representation. In some embodiments, the multimodal language model 116 may include decoders to generate outputs in various modalities. For example, a text decoder generates textual responses, while an image decoder may create visual content. During training, the multimodal language model may use large-scale datasets that include paired data from multiple modalities (e.g., image-caption pairs, video with subtitles). The training may involve techniques like supervised learning, reinforcement learning with human feedback (RLHF), and fine-tuning to ensure the model performs well across different tasks. For applications like text generation or video understanding, the multimodal language model 116 may include specialized heads that may be fine-tuned for specific tasks.

The multimodal language model 116 may correspond to at least one of a multimodal large language model (MLLM), a vision language model (VLM), a vision large language model (VLLM), an image captioning model, or a three-dimensional large language model (3D-LLM).

As an artificial deep neural network, the multimodal language model 116 may be referred to as a computational network or a system of artificial neurons in a neural network, arranged in a plurality of layers, as nodes. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on a training dataset.

Each node of the multimodal language model 116 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function.

In training of the multimodal language model 116, one or more parameters of each node of the neural network may be updated based on whether an output of the final layer for a given input (from the training dataset) matches a correct result based on a loss function for the neural network. The above process may be repeated for same or a different input until a minima of loss function is achieved, and a training error may be minimized. Several methods for training are known in art, for example, gradient descent, stochastic gradient descent, batch gradient descent, gradient boost, meta-heuristics, and the like.

The multimodal language model 116 may include electronic data, which may be implemented as, for example, a software component of an application executable on the electronic device. The multimodal language model 116 may rely on libraries, external scripts, or other logic/instructions for execution by a processing device. The multimodal language model 116 may include code and routines configured to enable a computing device, such as the electronic device to perform one or more operations such as the generation of the textual description 118. Additionally, or alternatively, the multimodal language model 116 may be implemented using hardware including a processor, a microprocessor (e.g., to perform or control performance of one or more operations), a field-programmable gate array (FPGA), or an application-specific integrated circuit (ASIC). Alternatively, in some embodiments, the multimodal language model 116 may be implemented using a combination of hardware and software.

As used herein, the term "network infrastructure device 120" may refer to any hardware that facilitates the communication, management, and operation of a network. Examples of the network infrastructure device 120 may include, but are not limited to, a router, a network switch, a network security device, an access point, or a server.

The network infrastructure device 120 may be configured to receive the textual description 118 via the communication network 122. After receiving the textual description 118, the network infrastructure device 120 may reconstruct a synthetic version of the visual information, based on application of a multimodal language model (same as or similar to the multimodal language model 116) or a text-to-image generative neural network on the textual description 118.

In an exemplary embodiment, the network infrastructure device 120 may be implemented as a cloud server and may execute operations through web applications, cloud applications, HTTP requests, repository operations, file transfer, and the like. Other example implementations of the server may include, but are not limited to, a database server, a file server, a web server, a media server, an application server, a mainframe server, or a cloud computing server. In at least one embodiment, the network infrastructure device 120 may be implemented as a plurality of distributed cloud-based resources by use of several technologies that are well known to those ordinarily skilled in the art.

The communication network 122 may include a communication medium through which the vehicle 102, the sensor system 108, the ECU 112, and the network infrastructure device 120 may communicate with each other. The communication network 122 may be a wireless connection. Examples of the communication network 122 may include, but are not limited to, the Internet, a cloud network, Cellular or Wireless Mobile Network (such as Long-Term Evolution and 5G New Radio), satellite network (e.g., a network of a set of low earth orbit satellites), a Wireless Fidelity (Wi-Fi) network, a Personal Area Network (PAN), Vehicle-to-Everything (V2X) network, a Cellular-V2X network, a Local Area Network (LAN), or a Metropolitan Area Network (MAN). Various devices in the environment diagram 100 may be configured to connect to the communication network 122 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the vehicle 102 may receive the vehicle data 110 from the sensor system 108 of the vehicle 102. The vehicle data 110 may include visual information associated with the surrounding environment 104 of the vehicle 102. The visual information may include at least one of image(s) associated with the surrounding environment 104, a 2D image sequence associated with the surrounding environment 104, or a 3D scan associated with the surrounding environment 104. In some embodiments, the visual information may include a plurality of images corresponding to a plurality of viewpoints around the vehicle 102. The plurality of images may together capture, for example, a 360-degree view of the surrounding environment 104 of the vehicle 102.

In certain embodiments, the vehicle data 110 may include non-visual information, including but not limited to, telematics data, sound signals associated with the surrounding environment 104, surrounding environment data, geolocation data, driving preferences data, safety and diagnostics data, or navigation data. By way of example, and not limitation, the non-visual information may include on-board diagnostic data (OBD) parameters of the vehicle 102, speed information of the vehicle 102, acceleration and deacceleration information of the vehicle 102, a health status of the vehicle 102, road conditions related to a route of the vehicle 102, weather conditions related to the route of the vehicle 102, Global Positioning System (GPS) information of the route of the vehicle 102, tachometer information of the vehicle 102, over-speeding information of the vehicle 102, lane-changing information of the vehicle 102, driving behavior of a driver of the vehicle 102, vehicle occupancy information of the vehicle 102, fuel efficiency information of the vehicle 102, engine tuning information of the vehicle 102, battery charging information of the vehicle 102, battery health information of the vehicle 102, tire pressure information of the vehicle 102, maintenance/service information of the vehicle 102, and the like. Details related to the reception of the vehicle data 110 are further provided, for example, in FIG. 7 (at 704).

The vehicle 102 may prepare the prompt 114 for the multimodal language model 116 based on the visual information. The prompt 114 may be a natural language text describing the task to be performed by the multimodal language model 116. The natural language text may be in form of an instruction that may be interpreted and understood by the multimodal language model 116. Details related to the preparation of the prompt are further provided, for example, in FIGS. 3A, 3B, 4A, 4B, 5A, and 5B.

The vehicle 102 may generate the textual description 118 associated with the visual information based on the application of the multimodal language model 116 on the prompt 114. By way of example, and not limitation, the textual description 118 may be at least one of a natural language description of the scene depicted via the visual information, a natural language description of the real-world objects in the scene, a natural language description of the one or more activities depicted via the visual information, or the description of the unsafe driving behavior of the driver 106. Details related to the generation of the textual description 118 are further provided, for example, in FIGS. 3A, 3B, 4A, 4B, 5A, and 5B.

Instead of transmitting the vehicle data 110, the vehicle 102 may transmit the textual description 118 to the network infrastructure device 120, via the communication network 122. Details related to the transmission of the textual description 118 are further provided, for example, in 3A, 3B, 4A, 4B, 5A, and 5B.

Using the multimodal language model 116 to describe the vehicle data 110, such as images, and transmitting the textual description 118 instead of the visual information themselves offers several advantages. The transmission significantly reduces bandwidth usage and transmission times due to the smaller size of text files compared to high-resolution images or 3D data, leading to cost savings, especially in environments with metered data usage or high bandwidth costs. Textual descriptions may be easier to process, store, and search, enhancing data management and retrieval. Additionally, transmitting text instead of images or 3D data helps protect sensitive visual information, reducing privacy risks. Text data may be also more scalable and universally compatible with various systems and devices, facilitating easier integration with existing infrastructure. Furthermore, the faster transmission of smaller text files may reduce latency, improving the responsiveness of real-time applications. By leveraging these benefits, organizations (e.g., vehicle's OEM) may optimize data transmission, enhance operational efficiency, and reduce costs.

Figure 2:
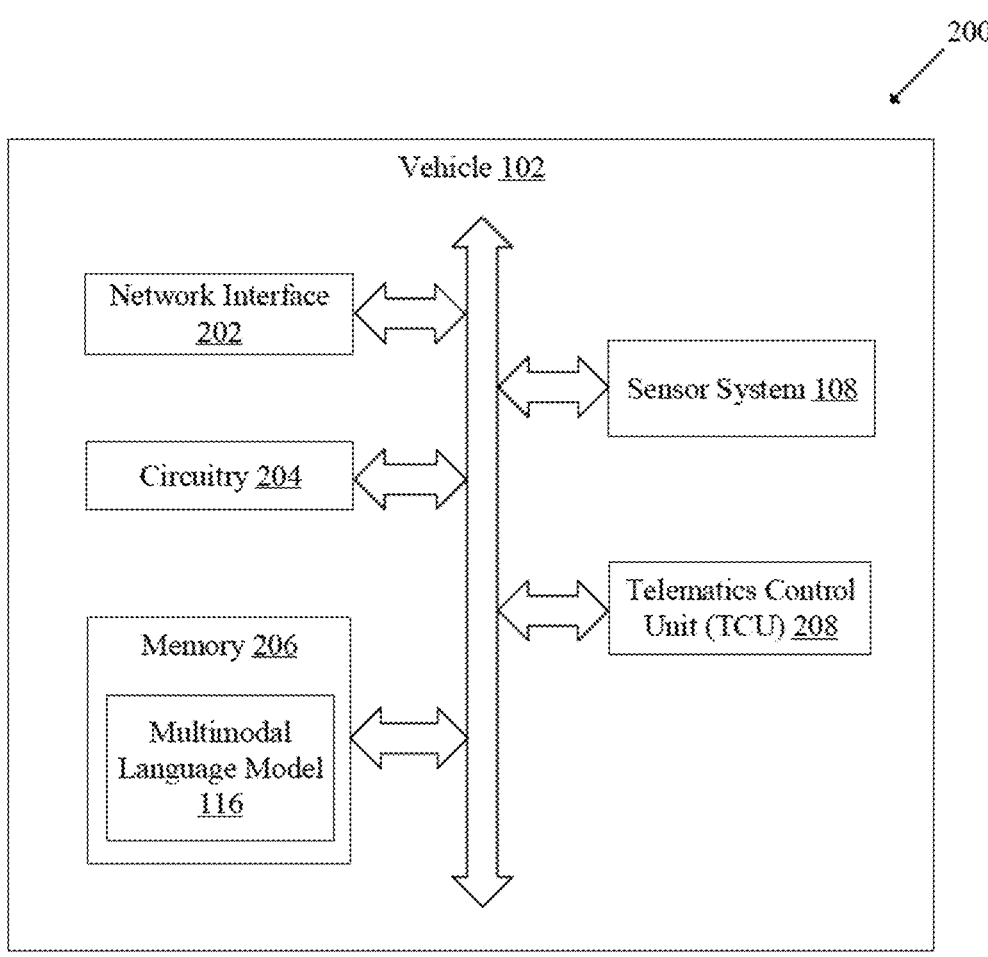
FIG. 2 is a block diagram that illustrates an exemplary vehicle of FIG. 1, in accordance with an embodiment of the disclosure.

FIG. 2 is a block diagram that illustrates an exemplary vehicle of FIG. 1, in accordance with an embodiment of the disclosure. FIG. 2 is explained in conjunction with elements from FIG. 1. With reference to FIG. 2, there is shown a block diagram 200 of the vehicle 102. The vehicle 102 may include a network interface 202, circuitry 204, a memory 206, a sensor system 108, and a telematics control unit (TCU) 208. It should be noted that the vehicle 102 may include other components that are not illustrated or described in FIG. 2. The description of other components of the vehicle 102 has been omitted from the disclosure for the sake of brevity.

The network interface 202 may include suitable logic, control circuitry, and interfaces that may be configured to facilitate communication between the vehicle 102, the sensor system 108, and the network infrastructure device 120, via the communication network 122. The network interface 202 may be implemented by use of various known technologies to support wired or wireless communication of the vehicle 102 with the communication network 122. The network interface 202 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry. The network interface 202 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

The ECU 112 may include the circuitry 204 and the memory 206 that may be configured to store the multimodal language model 116. The circuitry 204 may include suitable logic, control circuitry, and interfaces that may be configured to execute program instructions associated with different operations to be executed by the vehicle 102 (e.g., TCU functions). The circuitry 204 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 204 may be implemented based on a number of processor technologies known in the art. Examples of implementations of the circuitry 204 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 206 may include suitable logic, control circuitry, and interfaces that may be configured to store the one or more instructions to be executed by the circuitry 204. The memory 206 may be capable of reading and writing data at high speeds, facilitating quick retrieval and manipulation of information by the system's processing units. In some implementations, the memory 206 may be used to hold data structures, variables, and program instructions that are frequently accessed during the execution of software applications or system operations. The memory 206 may work in conjunction with other components, such as a persistent data storage, to manage the flow of information within the vehicle 102. Example implementations of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The TCU 208 may be an embedded electronic device that wirelessly connects the vehicle 102 to other devices (such as the network infrastructure device 120, cloud storage, or other vehicles through V2X standards over a network). The TCU 208 may collect and transmit real-time data (such as the vehicle data 110) about the vehicle's performance, location, and other vital statistics by connecting with various subsystems (such as the sensor system 108) in the vehicle 102 via data and control buses. The TCU 208 may include components such as a satellite navigation system, a microcontroller, a mobile networking unit, an external unit for cellular communication, a unit that processes electrical signals, a memory card for storing information, and a battery module. In an embodiment, the ECU 112 may be integrated with the TCU 208.

The functions or operations executed by the vehicle 102, as described in FIG. 1, may be performed by the circuitry 204. Operations executed by the circuitry 204 are described in detail, for example, in FIGS. 3A, 3B, 4A, 4B, 5A, 5B, 6A, and 6B.

Figure 3A:
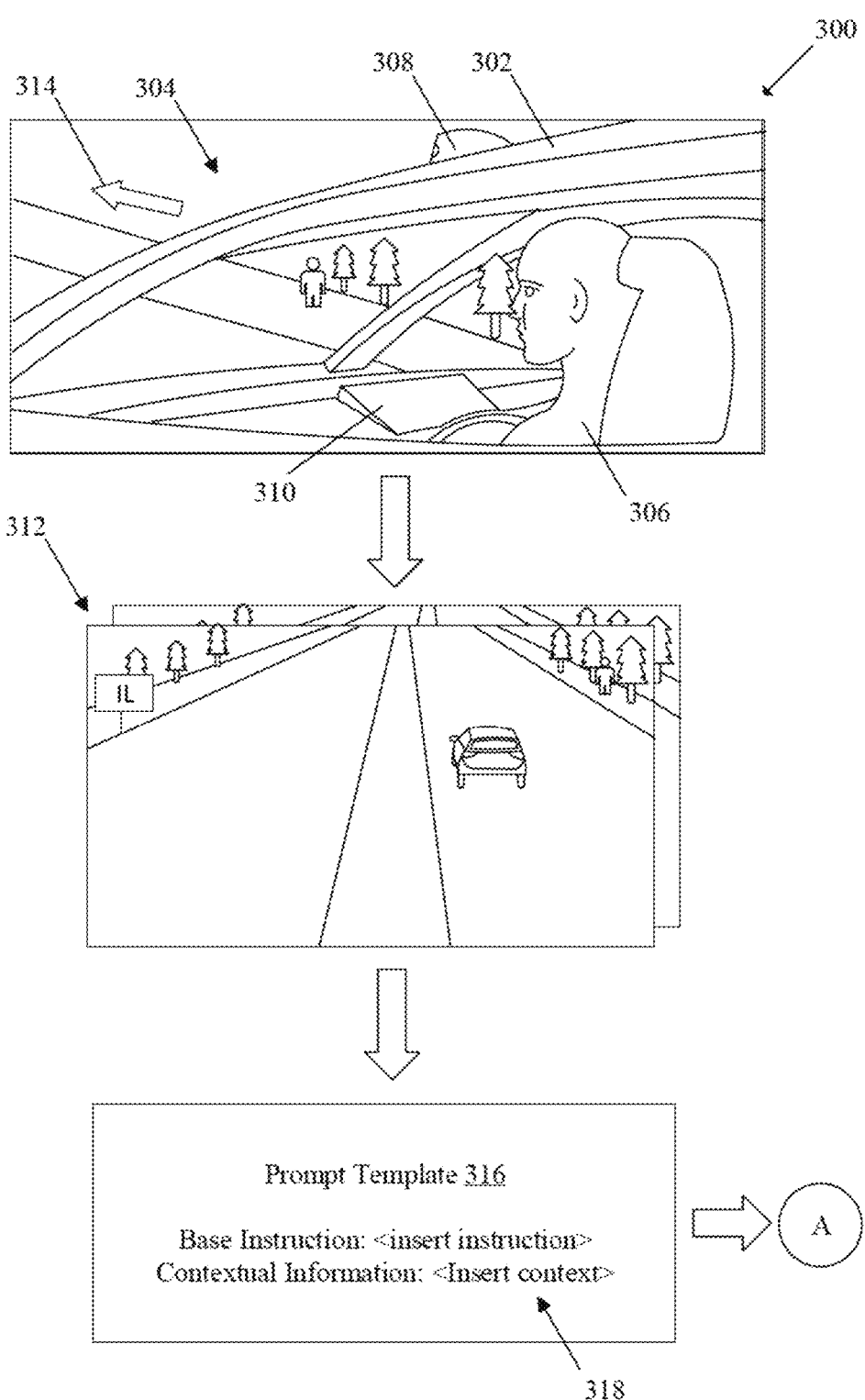

FIGS. 3A and 3B are diagrams that collectively illustrate an exemplary scenario for data transfer as text using multimodal language models, in accordance with an embodiment of the disclosure. FIGS. 3A and 3B are explained in conjunction with elements from FIG. 1 and FIG. 2. With reference to FIGS. 3A and 3B, there is shown an exemplary scenario 300. The exemplary scenario 300 depicts a vehicle 302 in a surrounding environment 304. A driver 306 is further shown inside the vehicle 302 facing objects (such as trees or pedestrians) in the surrounding environment 304. A set of vehicular sensors (such as a camera 308) may be installed in the vehicle 302 as part of the sensor system 108 of the vehicle 302 to capture the vehicle data 110 including the visual information associated with the surrounding environment 304 of the vehicle 302.

For example, the surrounding environment 304 may show a sparse traffic or a sparsely populated area. In this scenario, the vehicle 302 may receive from the sensor system 108, the vehicle data 110 including the visual information associated with the surrounding environment 304 of the vehicle 302. In some instances, the vehicle data 110 may further include non-visual information including at least one of the telematics data, the sound signals associated with the surrounding environment 304, the surrounding environment data, the geolocation data, the driving preferences data, the driver identification data, the safety and diagnostics data, or the navigation data. The vehicle data 110 may be displayed through a display panel 310 of the vehicle 302 in form of the visual information.

In some instances, the visual information may include a plurality of images 312 corresponding to at least one viewpoint (e.g., front 314) of a plurality of viewpoints (for example, left, right, front 314, and rear) around the vehicle 302. In some other instances, the plurality of viewpoints may be captured for determination of metadata associated with the visual information. The metadata may be indicative of the event, the object, the activity, the pedestrian, the timestamp, or the historical data associated with the visual information. For example, the metadata may reveal a sudden braking event, identify objects like other vehicles or traffic signs, describe activities such as a pedestrian crossing the street, or provide information about pedestrians detected nearby. Additionally, the metadata may include timestamps to record the exact time each image was captured, which may be crucial for synchronizing data and analyzing events in sequence. Historical data may also be included, offering insights into previous locations the vehicle 302 has visited or past events recorded.

The vehicle 302 may extract from the vehicle data 110, contextual information that includes at least one image (for example, the plurality of images 312) of the surrounding environment 304 from the visual information. In case the vehicle data 110 also includes the non-visual information, the vehicle 302 may extract the contextual information from both the visual information and the non-visual information. Additionally, or alternatively, the vehicle 302 may extract the contextual information from both the visual information and the metadata associated with the visual information.

The vehicle 302 may retrieve a prompt template 316 that includes a base instruction and a placeholder 318 for the contextual information required for the generation of a textual description 322 associated with the plurality of images 312. Based on the extracted contextual information, a prompt 320 may be prepared to include the plurality of images 312 along with the base instruction. As shown, for example, the base instruction may be to "Identify all of the objects in the plurality of images and their relative positions in the surrounding environment".

The vehicle 302 may input the prompt 320 to the multimodal language model 116 and may generate the textual description 322 associated with the visual information (i.e., the plurality of images 312) based on application of the multimodal language model 116 on the prompt 320. The textual description 322 may include a natural language description of a scene depicted via the plurality of images 312 or a natural language description of real-world objects in the scene. As shown, for example, the textual description 322 may include details such as "the vehicle is on a section of Route 66 in Illinois, with another four-wheeled vehicle in front, a pedestrian on a pavement on the right side of the road, and oak trees on both sides of the road". The vehicle 302 may transmit, via the communication network 122, the textual description 322 to the network infrastructure device 120.

In another scenario, if the vehicle 302 is travelling from "ALASKA" to "VIRGINIA", the vehicle 302 may extract from the vehicle data 110, contextual information about an accident that occurred on $3^{rd}$ July 2023, while another vehicle was travelling through the same location towards "VIRGINIA". The contextual information may also include images (captured by the camera 308) of the surrounding environment. Based on the contextual information, a prompt may be prepared to include the contextual information along with the base instruction to generate the textual description. For example, the prompt may be prepared to include the base instruction as "Identify potential issues on the highway that typically lead to accidents". The prompt may be fed to the multimodal language model 116 to generate the textual description. The textual description may include details of blind spots, faulty traffic signals, or damaged roads depicted in the images (included in the prompt). Additionally, or alternatively, the textual description may include a description of an unsafe driving behavior of a user of the vehicle, or a description of an unsafe driving behavior of a different vehicle in the surrounding environment.

In some instances, the multimodal language model 116 may be prompted to suggest alternate travel routes to avoid accidents. For example, the suggestion may include "travel towards Alaska Marine State Highway Road and reach the location Anchorage, and then from Anchorage the driver should easily reach the destination location Virginia within the shortest period of time without facing any hassles".

It should be noted that the exemplary scenario 300 of FIGS. 3A and 3B is for exemplary purposes and should not be construed to limit the scope of the disclosure.

Figure 4A:
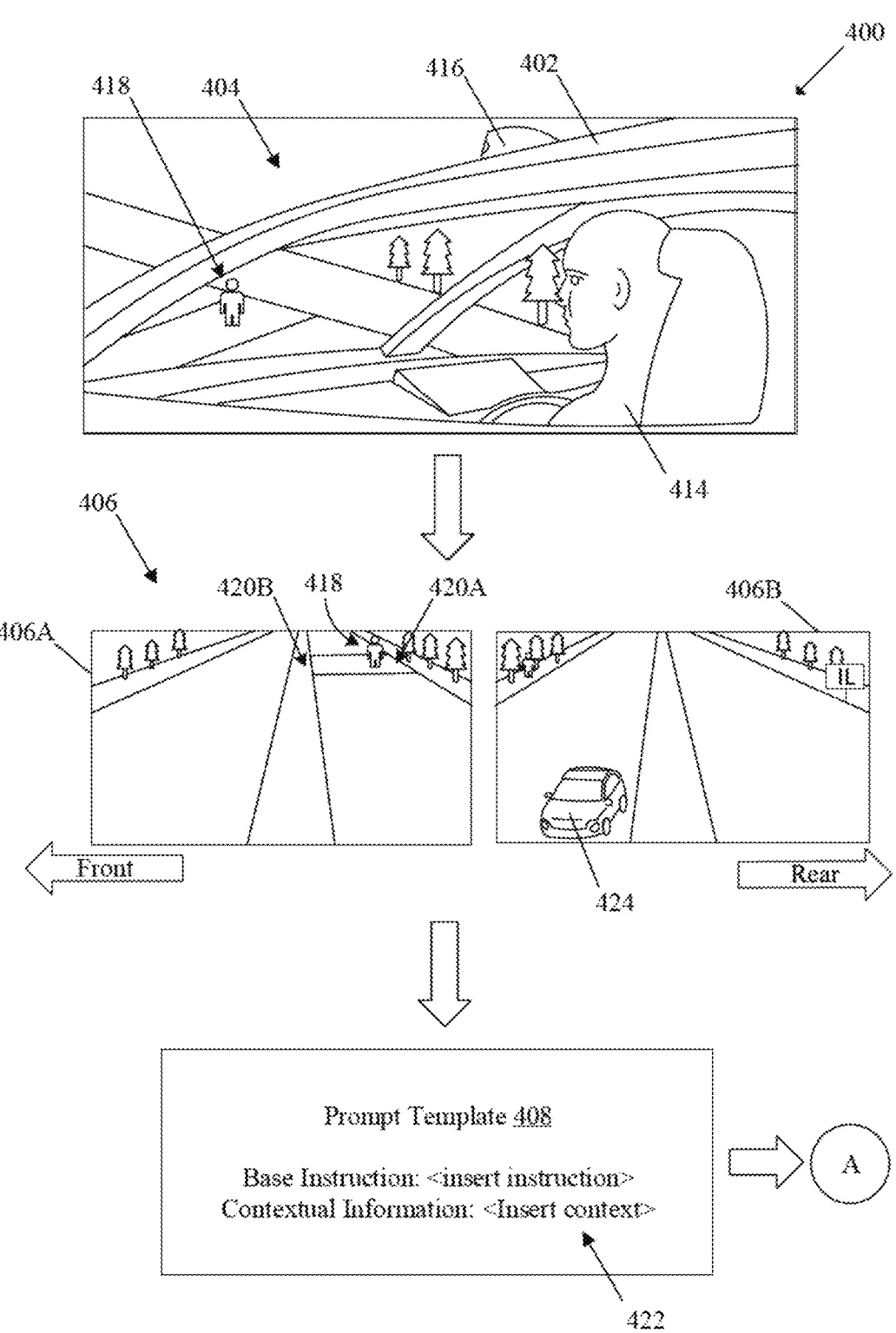

FIGS. 4A and 4B are block diagrams that collectively illustrate an exemplary scenario for data transfer as text using multimodal language models, in accordance with an embodiment of the disclosure. FIGS. 4A and 4B are explained in conjunction with elements from FIG. 1, FIG. 2, and FIGS. 3A and 3B. With reference to FIGS. 4A and 4B, there is shown an exemplary scenario 400 for the data transfer as text using the multimodal language model 116. The exemplary scenario 400 includes a vehicle 402 in a surrounding environment 404, a plurality of images 406 of the surrounding environment 404, a prompt template 408, a prompt 410, and a textual description 412. A driver 414 is further shown inside the vehicle 402 facing objects in the surrounding environment 404. A set of vehicular sensors (such as a camera 416) may be installed in the vehicle 402 as part of the sensor system 108 of the vehicle 402 to capture the vehicle data 110 including the visual information associated with the surrounding environment 404 of the vehicle 402.

As shown, for example, the surrounding environment 404 may include a pedestrian 418 trying to cross the road from a first position 420A to a second position 420B of the road. In this scenario, the vehicle 402 may receive from the camera 416, the vehicle data 110 comprising the visual information associated with the surrounding environment 404 of the vehicle 402. The visual information may include the plurality of images 406 (e.g., an image 406A from a front of the vehicle 402 and an image 406B from a rear side of the vehicle 402) corresponding to a plurality of viewpoints (e.g. front and rear) around the vehicle 402.

In some instances, the plurality of images 406 may be captured for determination of the metadata associated with the visual information. The metadata may be indicative of, for example, an event, an object, an activity, a pedestrian, a timestamp, or historical data associated with the visual information. For example, the vehicle 402 may receive the image of the pedestrian 418 as the metadata, while the driver is driving the vehicle 402.

The vehicle 402 may retrieve the prompt template 408 that includes a base instruction and a placeholder 422 for contextual information required for the generation of the textual description 412. The vehicle 402 may extract the contextual information from both the visual information and the metadata. For instance, the contextual information may include at least one image of the pedestrian 418 trying to cross the road from the first position 420A to the second position 420B and the plurality of images 406. The prompt 410 may be prepared to include the contextual information along with the base instruction for the generation of the textual description 412. In some instances, the contextual information may also include non-visual information such as a speed of the vehicle 402 at a time when the pedestrian 418 is crossing the road. As shown, for example, the prompt 410 may include a base instruction to "identify moving and non-moving objects in the scene and record any unsafe behavior of the objects at the given speed of the vehicle".

Based on the application of the multimodal language model 116 on the prompt 410, the vehicle 402 may generate the textual description 412. The textual description 412 may indicate objects such as other vehicles in the surrounding environment, pedestrians (including the pedestrian 418), traffic signs, road identifiers, or any road obstructions. Additionally, or alternatively, the textual description 412 may include observations, such as an unsafe behavior (e.g., jaywalking) of the pedestrian 418, a vehicle tailgating the vehicle 402, or an unsafe overtaking maneuver by another vehicle.

In an embodiment, the prompt 410 may include a query to identify road condition for generation of driving-related suggestions. Based on the application of the multimodal language model 116 on the prompt 410, the textual description 412 may be generated. For instance, the textual description 412 may identify the road condition as poor with unpaved dirt section or tarmac with a lot of potholes. The textual description 412 may also include a suggestion for the driver to limit the speed of the vehicle 402 up to 30-40 miles per hour due to the road condition and presence of pedestrians (such as the pedestrian 418) around the road. As shown, for example, the textual description 412 may be that "the vehicle is on a road section with a vehicle tailgating the vehicle and a person is crossing the road in an unsafe manner. The road has oak trees on both sides of the road. The road condition is poor with potholes, and it is advised to drive car up to a speed of 30-40 mph".

It should be noted that the exemplary scenario 400 of FIGS. 4A and 4B is for exemplary purposes and should not be construed to limit the scope of the disclosure.

Figure 5A:
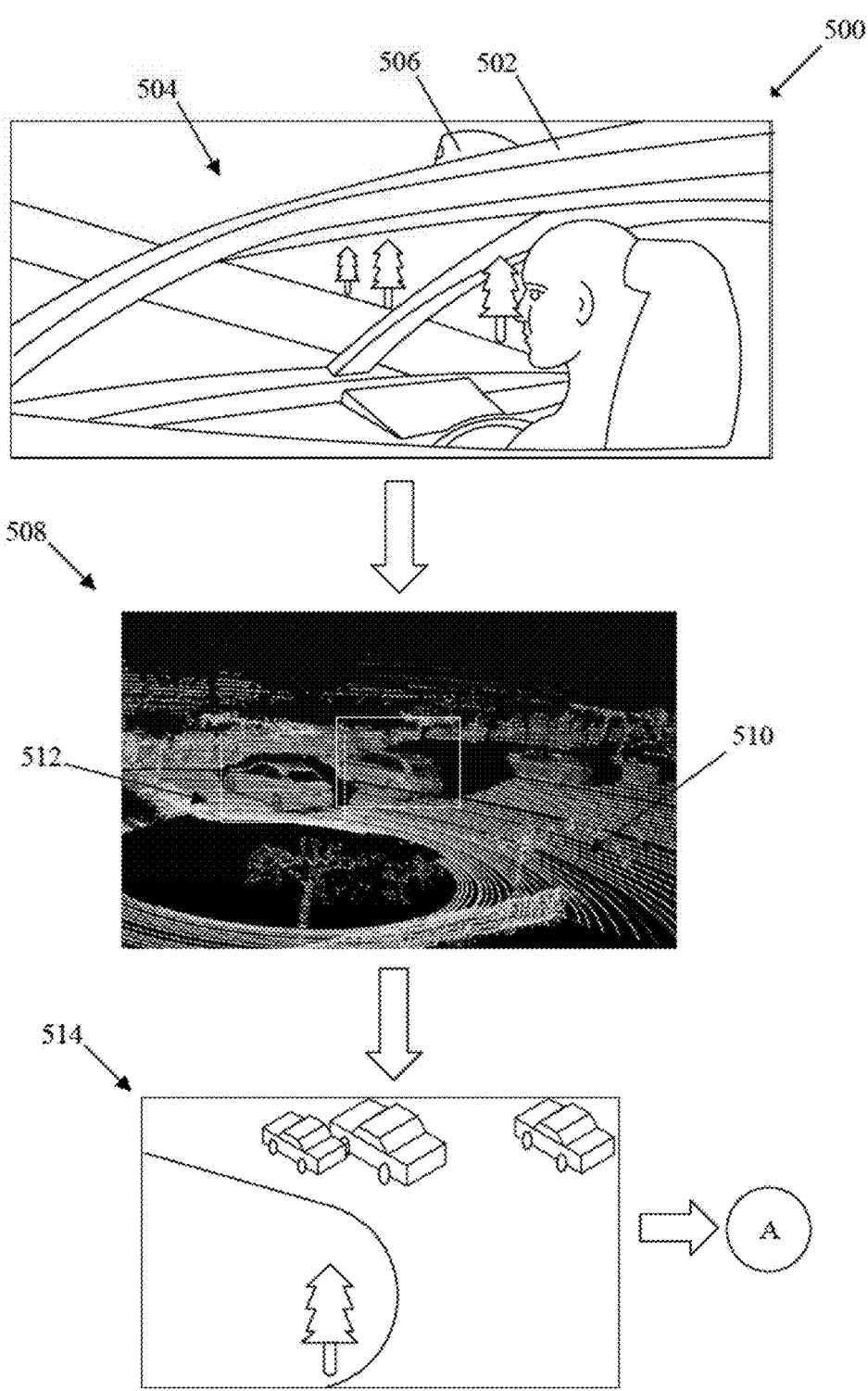
FIGS. 5A and 5B are block diagrams that collectively illustrate an exemplary scenario for data transfer as text using multimodal language models, in accordance with an embodiment of the disclosure.
Figure 5B:
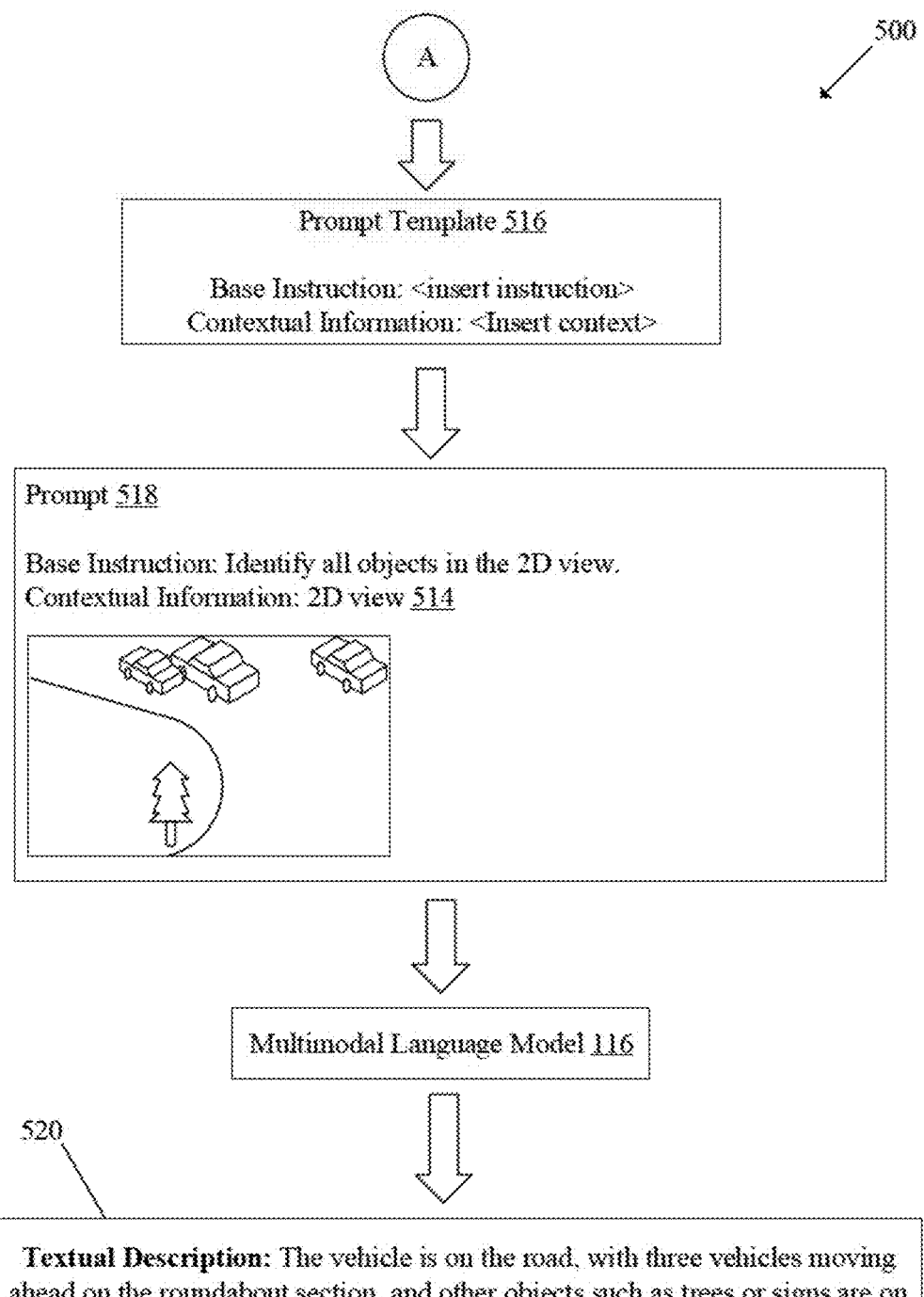

FIGS. 5A and 5B are block diagrams that collectively illustrate an exemplary scenario for data transfer as text using multimodal language models, in accordance with an embodiment of the disclosure. FIGS. 5A and 5B are explained in conjunction with elements from FIG. 1, FIG. 2, FIGS. 3A and 3B, and FIGS. 4A and 4B. With reference to FIGS. 5A and 5B, there is shown an exemplary scenario 500 that depicts a vehicle 502 and a surrounding environment 504 around the vehicle 502. The vehicle 502 includes a LIDAR sensor 506 to perform a 3D scan 508 of the surrounding environment 504. As shown, for example, the 3D scan 508 includes a roundabout road 510, vehicles 512 moving on the roundabout road 510, and other objects such as trees or signs on the sides of the roundabout road 510.

The vehicle 502 may receive from the LiDAR sensor 506, vehicle data comprising visual information associated with the surrounding environment 504 of the vehicle 502. The visual information may include the 3D scan 508 of the surrounding environment 504. The vehicle 302 may generate a 3D mesh based on the 3D scan 508 of the surrounding environment 504 and generate a 2D view 514 of the 3D mesh.

Further, the 2D view 514 along with a base instruction may be combined and inserted into a prompt template 516 to prepare a prompt 518. The prompt 518 may include the 2D view 514 as contextual information along with the base instruction for the generation of a textual description 520 associated with the 2D view 514 of the 3D mesh. As shown, for example, the base instruction may include a request to "identify objects in the 2D view". The 2D view 514 may be an image of the 3D mesh from a particular viewpoint and may be displayed through a display panel of the vehicle 302. In some instances, multiple 2D views in the form of images may be stitched to output a single 2D view.

The prepared prompt 518 may be further used to generate the textual description 520 associated with the visual information (i.e., the 2D view 514), based on the application of the multimodal language model 116 on the prompt 518. The generated textual description 520 may include a natural language description of the objects included in the 2D view 514. As shown, the textual description 520 may specify that "the vehicle is on the road, with three vehicles moving ahead on the roundabout section, and other objects such as trees or signs are on the sides of the roundabout".

It should be noted that the exemplary scenario 500 of FIGS. 5A and 5B is for exemplary purposes and should not be construed to limit the scope of the disclosure.

Figure 6A:
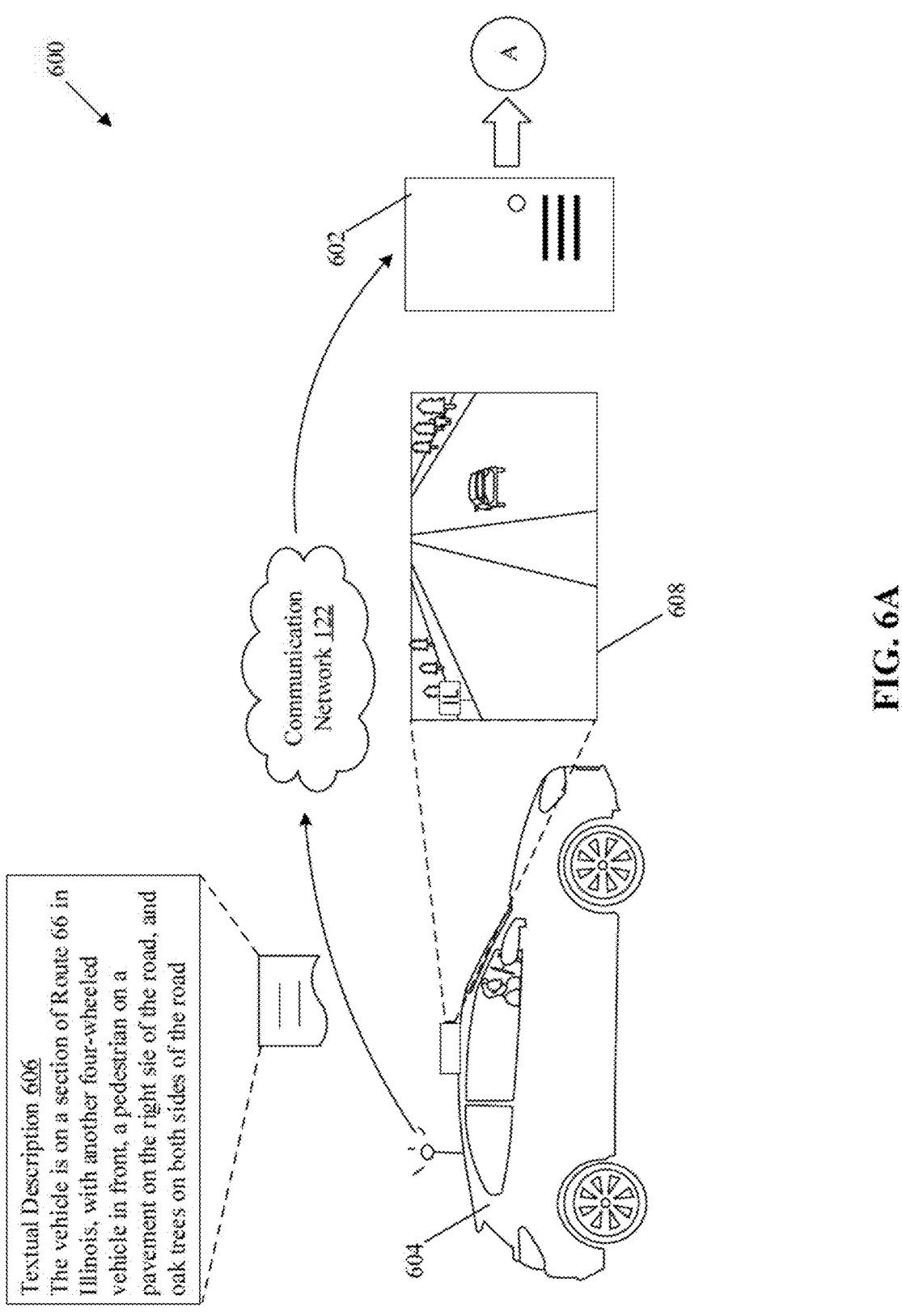
FIGS. 6A and 6B are block diagrams that collectively illustrate an exemplary scenario for reconstruction of visual information from a text description using multimodal language models, in accordance with an embodiment of the disclosure.
Figure 6B:
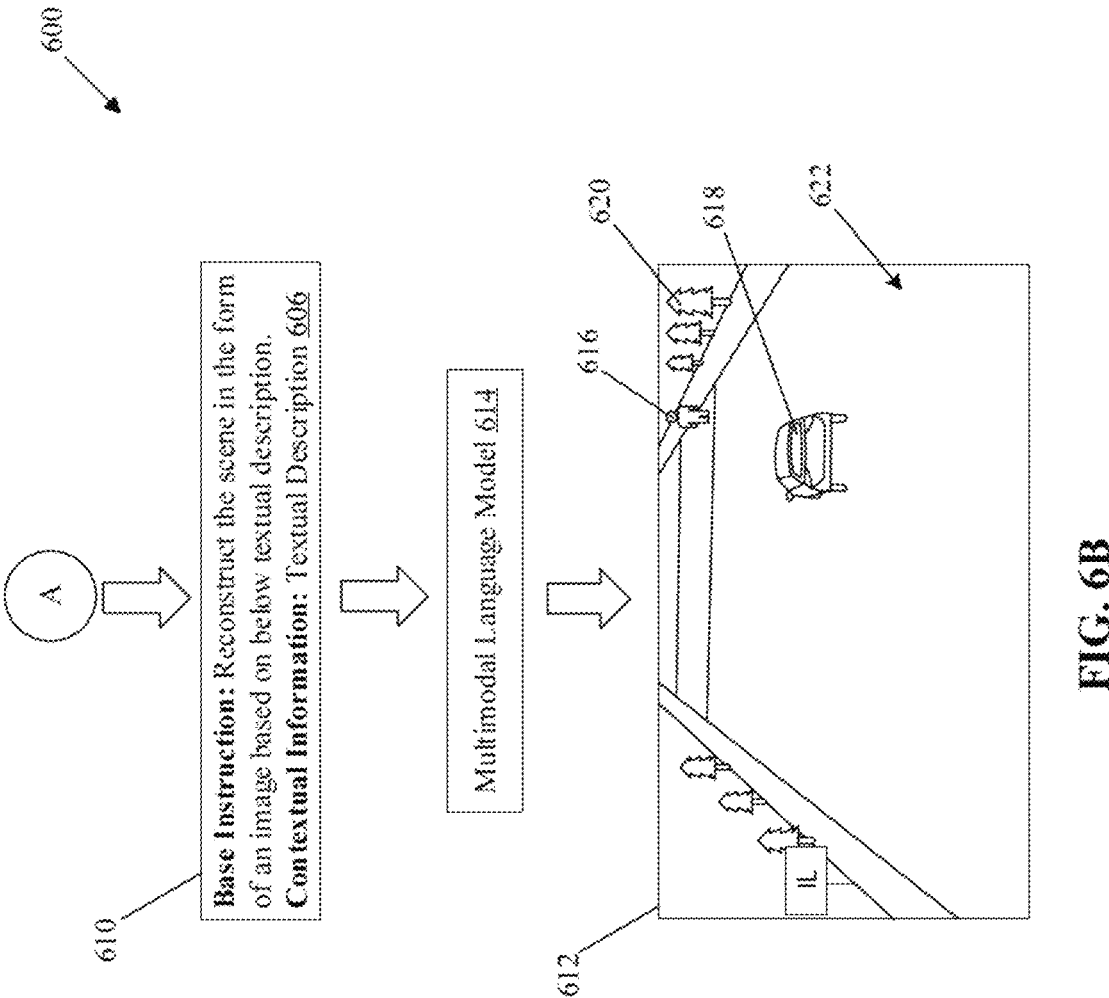

FIGS. 6A and 6B are block diagrams that collectively illustrate an exemplary scenario for reconstruction of visual information from a text description using multimodal language models, in accordance with an embodiment of the disclosure. FIGS. 6A and 6B are explained in conjunction with elements from FIG. 1, FIG. 2, FIGS. 3A & 3B, FIGS. 4A & 4B, FIGS. 5A & 5B. With reference to FIGS. 6A & 6B, there is shown an exemplary scenario 600. In the exemplary scenario 600, there is shown a network infrastructure device 602 that is communicatively coupled to a vehicle 604.

During operation, the vehicle 604 may transmit to the network infrastructure device 602, a textual description 606 associated with visual information (such as an image 608 of a surrounding environment outside the vehicle 604). As shown, for example, the textual description 606 may specify that the vehicle 604 is on a curved section of Route 66 in Illinois, with another four-wheeled vehicle in front, a pedestrian on a pavement on the right side of the road, and oak trees on both sides of the road.

The network infrastructure device 602 may prepare a prompt 610 that includes the textual description 606 as contextual information and a base instruction to reconstruct a scene (i.e., the visual information in the form of an image 612, for example) from the contextual information. Once prepared, the network infrastructure device 602 may feed the prompt 610 to a multimodal language model 614 (which may be same as the multimodal language model 116). In some instances, additional contextual information such as date-time information, weather information, specific visual features of objects (object color, object brand, object speed/ state, etc.) in the textual description 606 may be included in the prompt 610 to improve accuracy of the reconstruction.

The multimodal language model 614 may use the contextual information and the base instruction to reconstruct the scene in a form of the image 612 that includes the objects (a pedestrian 616, a four-wheeled vehicle 618, trees 620, a curved section 622) as described in the contextual information. The reconstructed scene in the image 612 may or may not be exactly same as the scene illustrated in the original image (i.e., the image 608) and the quality of reconstruction may depend on details covered in the contextual information.

It should be noted that the exemplary scenario 600 of FIGS. 6A and 6B is for exemplary purposes and should not be construed to limit the scope of the disclosure.

FIG. 7 is a flowchart that illustrates exemplary method of data transfer as text using multimodal language models, in accordance with an embodiment of the disclosure. FIG. 7 is described in conjunction with FIG. 1, FIG. 2, FIG. 3A, FIG. 3B, FIG. 4A, FIG. 4B, FIG. 5A, FIG. 5B, FIG. 6A, and FIG. 6B. With reference to FIG. 7, there is shown a flowchart 700. The flowchart 700 includes operations from 702 to 710 that may be implemented, for example, by the circuitry of the vehicle 102 of FIG. 2. The operations of the flowchart 700 may start at 702 and proceed to 704.

At 704, the vehicle data 110 comprising the visual information may be received from the sensor system 108 of the vehicle 102. The visual information may be associated with the surrounding environment 104 of the vehicle 102. In an embodiment, the circuitry 204 may be configured to receive the vehicle data 110 from the sensor system 108 of the vehicle 102. Details related to the reception of the vehicle data 110 from the sensor system 108 of the vehicle 102 are provided, for example, in FIGS. 1, 3A, 3B, 4A, 4B, 5A, and 5B.

At 706, the prompt 114 may be prepared for the multimodal language model 116 based on the visual information. In an embodiment, the circuitry 204 may be configured to prepare the prompt 114 for the multimodal language model 116 based on the visual information. The prompt 114 may be a natural language text describing a task to be performed by the multimodal language model 116. Details related to the preparation of the prompt 114 for the multimodal language model 116 are provided, for example, in FIGS. 1, 3A, 3B, 4A, 4B, 5A, and 5B.

At 708, the textual description 118 associated with the visual information may be generated based on the application of the multimodal language model 116 on the prompt 114. In an embodiment, the circuitry 204 may be configured to generate the textual description 118 associated with the visual information, based on the application of the multimodal language model 116 on the prompt 114. Details related to the generation of the textual description 118 are provided, for example, in FIGS. 1, 3A, 3B, 4A, 4B, 5A, and 5B.

At 710, the textual description 118 may be transmitted to the network infrastructure device 120, via the communication network 122. In an embodiment, the circuitry 204 (using the TCU 208) may be configured to transmit the textual description 118 to the network infrastructure device 120, via the communication network 122. Details related to the transmission of the generated textual description 118, for example, in FIGS. 1, 3A, 3B, 4A, 4B, 5A, 5B, 6A, and 6B. Control may pass to end.

Although the flowchart 700 is illustrated as discrete operations, such as, 704, 706, 708, and 710 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as, the circuitry). The instructions may cause the machine and/or computer (for example, the vehicle 102) to perform operations that may include receiving from the sensor system 108 of the vehicle 102, the vehicle data 110 comprising the visual information associated with the surrounding environment 104 of the vehicle 102. The operations may further include preparing the prompt for the multimodal language model 116 based on the visual information. The operations may further include generating the textual description associated with the visual information based on application of the multimodal language model 116 on the prompt. The operations may further include transmitting the textual description 118 to the network infrastructure device 120.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A vehicle, comprising:
   a memory configured to store a multimodal language model; and circuitry that:
      receives, from a sensor system of the vehicle, vehicle data comprising visual information associated with a surrounding environment of the vehicle;
      prepares a prompt for the multimodal language model based on the visual information;
      generates a textual description associated with the visual information based on application of the multimodal language model on the prompt; and
      transmits, via a communication network, the textual description to a network infrastructure device.

2. The vehicle according to claim 1, wherein the visual information includes at least one of:
   an image associated with the surrounding environment,
   a 2D image sequence associated with the surrounding environment, or
   a 3D scan associated with the surrounding environment.

3. The vehicle according to claim 1, wherein the multimodal language model corresponds to one of a multimodal large language model (MLLM), Vision Language Model (VLM), a Vision Large Language Model (VLLM), an Image Captioning Model, or a Three-Dimensional (3D) Large Language Model (3D-LLM).

4. The vehicle according to claim 1, wherein the circuitry further:
   retrieves a prompt template that includes a base instruction and a placeholder for contextual information required for the generation of the textual description;
   extracts, from the vehicle data, the contextual information that includes at least one image of the surrounding environment from the visual information; and
   inserts the contextual information into the prompt template to prepare the prompt.

5. The vehicle according to claim 1, wherein the visual information includes a plurality of images corresponding to a plurality of viewpoints around the vehicle, and
   the prompt is prepared to include the plurality of images along with base instruction for the generation of the textual description associated with the plurality of images.

6. The vehicle according to claim 1, wherein the visual information includes a 3D scan of the surrounding environment of the vehicle, and
   the circuitry further:
      generates a 3D mesh based on the 3D scan of the surrounding environment; and
      generates a 2D view of the 3D mesh, wherein the prompt is prepared to include the 2D view along with a base instruction for the generation of the textual description associated with the 2D view.

7. The vehicle according to claim 1, wherein the vehicle data further includes non-visual information including at least one of telematics data, sound signals associated with the surrounding environment, surrounding environment data, geolocation data, driving preferences data, driver identification data, safety and diagnostics data, or navigation data.

8. The vehicle according to claim 7, wherein the circuitry further extracts contextual information from both the visual information and the non-visual information, wherein the prompt is prepared to include the contextual information along with a base instruction for the generation of the textual description.

9. The vehicle according to claim 1, wherein the circuitry further:
   determines metadata associated with the visual information, wherein the metadata is indicative of an event, an object, an activity, a pedestrian, a timestamp, or historical data associated with the visual information; and
   extracts contextual information from both the visual information and the metadata,
      wherein the prompt is prepared to include the contextual information along with a base instruction for the generation of the textual description.

10. The vehicle according to claim 1, wherein the textual description includes at least one of:
   a natural language description of a scene depicted via the visual information,
   a natural language description of real-world objects in the scene,
   a natural language description of one or more activities depicted via the visual information,
   a description of an unsafe driving behavior of a user of the vehicle, or
   a description of an unsafe driving behavior of a different vehicle in the surrounding environment.

11. The vehicle according to claim 1, wherein the network infrastructure device:
   receives the textual description from the vehicle; and
   reconstructs a synthetic version of the visual information based on application a generative neural network on the textual description.

12. A method, comprising:
   in a vehicle comprising memory configured to store a multimodal language model:
      receiving, from a sensor system of the vehicle, vehicle data comprising visual information associated with a surrounding environment of the vehicle;
      preparing a prompt for the multimodal language model based on the visual information;
      generating a textual description associated with the visual information based on application of the multimodal language model on the prompt; and
      transmitting, via a communication network, the textual description to a network infrastructure device.

13. The method according to claim 12, further comprising:
   retrieving a prompt template that includes a base instruction and a placeholder for contextual information required for the generation of the textual description;
   extracting, from the vehicle data, the contextual information that includes at least one image of the surrounding environment from the visual information; and
   inserting the contextual information into the prompt template to prepare the prompt.

14. The method according to claim 12, further comprising preparing the prompt to include a plurality of images along with a base instruction for the generation of the textual description associated with the plurality of images,
   wherein the plurality of images corresponds to a plurality of viewpoints around the vehicle.

15. The method according to claim 12, further comprising:

generating a 3D mesh based on a 3D scan of the surrounding environment; and generating a 2D view of the 3D mesh, wherein the prompt is prepared to include the 2D view along with a base instruction for the generation of the textual description associated with the 2D view.

16. The method according to claim 12, wherein the vehicle data further includes non-visual information including at least one of telematics data, sound signals associated with the surrounding environment, surrounding environment data, geolocation data, driving preferences data, driver identification data, safety and diagnostics data, or navigation data.

17. The method according to claim 16, further comprising extracting contextual information from both the visual information and the non-visual information, wherein the prompt is prepared to include the contextual information along with a base instruction for the generation of the textual description.

18. The method according to claim 12, further comprising:

determining metadata associated with the visual information, wherein the metadata is indicative of an event, an object, an activity, a pedestrian, a timestamp, or historical data associated with the visual information; and extracting contextual information from both the visual information and the metadata, wherein the prompt is prepared to include the contextual information along with a base instruction for the generation of the textual description.

19. The method according to claim 12, further comprising:

receiving, by the network infrastructure device, the textual description from the vehicle; and reconstructing, by the network infrastructure device, a synthetic version of the visual information based on application a generative neural network on the textual description.

20. A non-transitory computer-readable medium having stored thereon, computer-executable instructions that when executed by a vehicle, causes the vehicle to execute operations, the operations comprising:

receiving, from a sensor system of the vehicle, vehicle data comprising visual information associated with a surrounding environment of the vehicle;

preparing a prompt for a multimodal language model based on the visual information;

generating a textual description associated with the visual information based on application of the multimodal language model on the prompt; and transmitting, via a communication network, the textual description to a network infrastructure device.

* * * * *